No. 782,854. PATENTED FEB. 21, 1905.
W. T. JOHNSON.
SIFTING SHOVEL.
APPLICATION FILED NOV. 17, 1903.
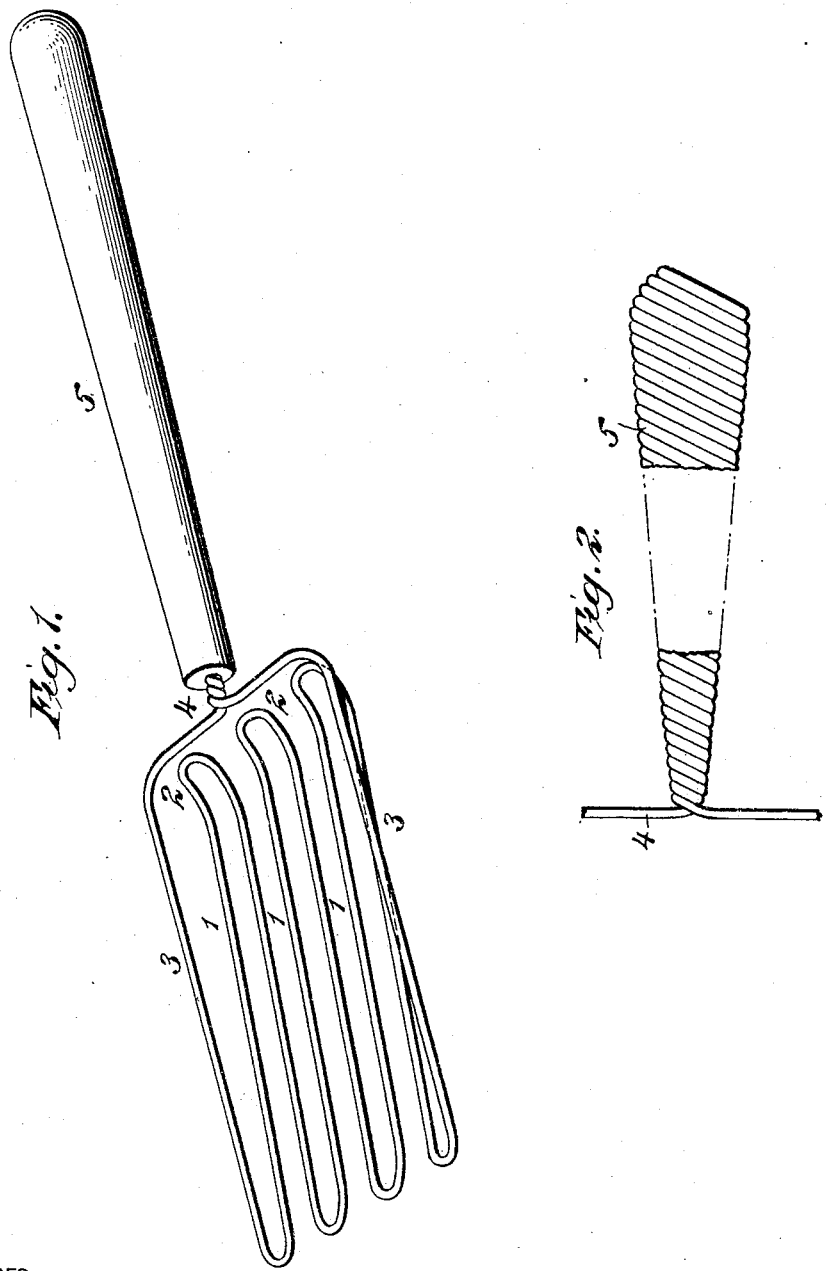
WITNESSES:
Karen Larsen
C. A. Pierce
INVENTOR
William T. Johnson.
BY A. M. Pierce,
ATTORNEY:

No. 782,854. Patented February 21, 1905.

UNITED STATES PATENT OFFICE.

WILLIAM T. JOHNSON, OF BROOKLYN, NEW YORK.

SIFTING-SHOVEL.

SPECIFICATION forming part of Letters Patent No. 782,854, dated February 21, 1905.

Application filed November 17, 1903. Serial No. 181,506.

*To all whom it may concern:*

Be it known that I, WILLIAM T. JOHNSON, a citizen of the United States, and a resident of Brooklyn, in the county of Kings and State of New York, have invented certain new and useful Improvements in Sifting-Shovels, of which the following is a specification.

My invention relates especially to means for separating cinders and unconsumed coal from ashes particularly for domestic use, and has for its object the provision of a very simple, cheap, and effective sifting-shovel.

To attain the desired end, my invention consists, essentially, in a sifting-shovel preferably made of a single piece of wire bent and curved in such a manner as to form parallel bars, partitions, or fingers, all of which will be hereinafter first fully described and then pointed out in the claim.

In the accompanying drawings, forming a part hereof, Figure 1 is a perspective view of a sifting-shovel embodying my invention. Fig. 2 is a view of a modified form of handle made of the wire constituting the body of the shovel.

Similar numerals of reference wherever they occur indicate corresponding parts in both figures.

1 1 are the bars or fingers of the shovel, the inner ends being curved upward at 2 2 and the side portions 3 3 raised above the level of the fingers 1. The ends of the wires are twisted together, as at 4, and are connected to a manipulating-handle 5, as in Fig. 1 of the drawings, or themselves constitute a handle, as in Fig. 2, either construction maintaining the spirit of my invention.

In operation the fingers of the shovel are easily passed beneath or into the mixed ashes, cinders, and coal in the pit of a stove or range, and when the shovel is lifted the ashes escape, requiring only a slight agitation of the implement, if any, leaving the unconsumed coal and cinders upon the shovel for depositing in any receptacle, avoiding all disagreeable handling thereof.

Having now fully described my invention, what I claim as new therein, and desire to secure by Letters Patent, is—

As a new article of manufacture, a sifting-shovel consisting of a handle from which extends a continuous wire bent back and forth upon itself forming a series of open loops or fingers, the outer side wires constituting sides for the shovel, and the inner extremities of the loops bent upward, forming a back, substantially as shown and described.

Signed at New York, in the county of New York and State of New York, this 16th day of November, A. D. 1903.

WILLIAM T. JOHNSON.

Witnesses:
A. M. PIERCE,
KAREN LARSEN.